UNITED STATES PATENT OFFICE.

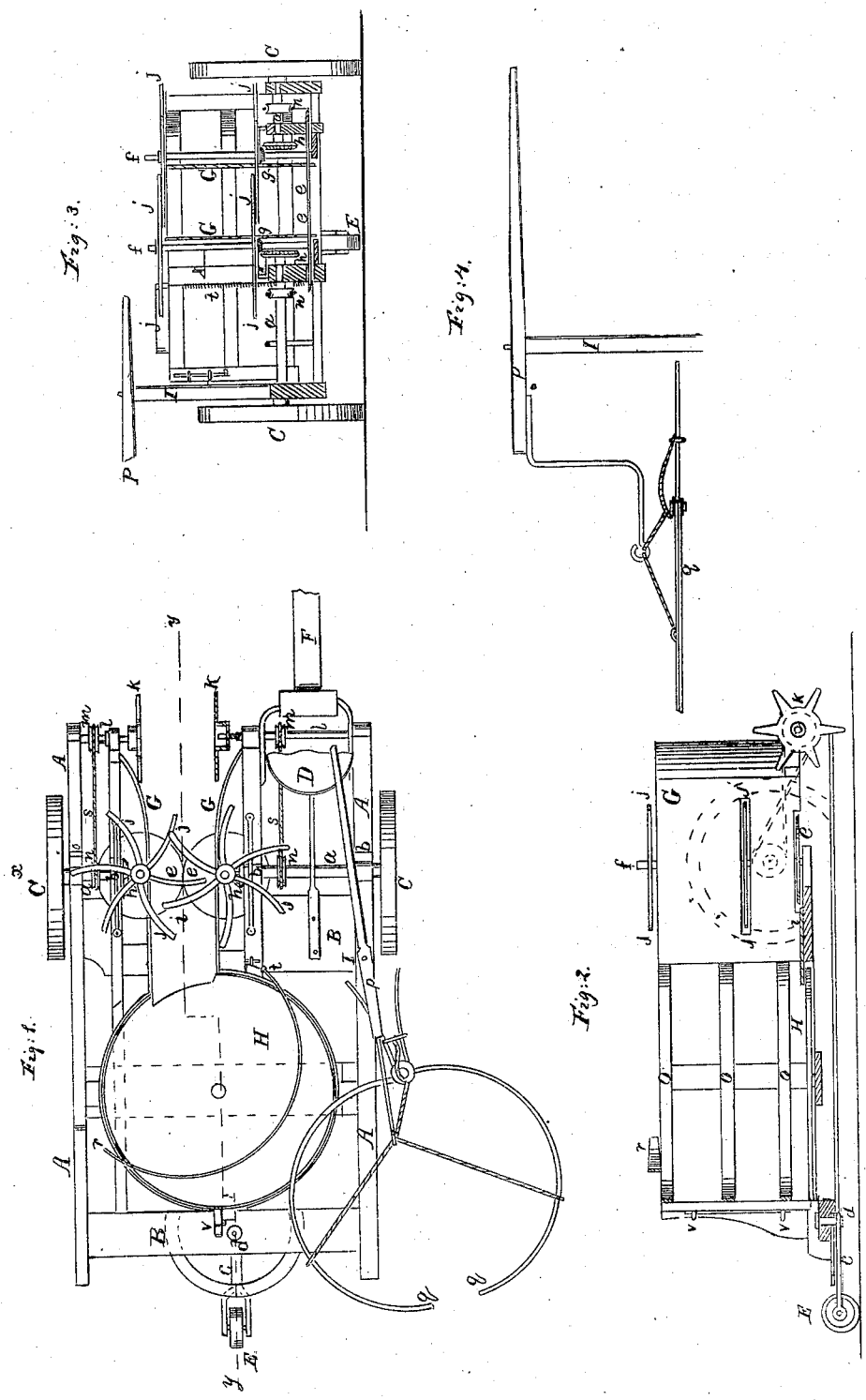

SAMUEL SECRIST, OF WEST LIBERTY, OHIO.

IMPROVEMENT IN CORN-HARVESTERS.

Specification forming part of Letters Patent No. 58,143, dated September 18, 1866.

*To all whom it may concern:*

Be it known that I, SAMUEL SECRIST, of West Liberty, in the county of Logan and State of Ohio, have invented a new and Improved Corn-Harvester; and I do hereby declare that the following is a full, clear, and exact description thereof, which will enable others skilled in the art to make and use the same, reference being had to the accompanying drawings, forming part of this specification, in which—

Figure 1 is a plan. Fig. 2 is a longitudinal section on the line $y\ y$. Fig. 3 is a cross-section on the line $x\ x$. Fig. 4 is a detached view of lever and clamp.

Similar letters of reference indicate like parts.

My invention consists in constructing a machine for harvesting Indian-corn stalks or sugar-cane by cutting them near the ground and discharging them in the rear of the machine in standing shocks. The machine is drawn by horses or oxen, and travels over a large area of ground in a short time, performing its work thoroughly and expeditiously, thus saving a vast deal of hand-labor now required to do the work.

To enable others to understand my invention, I will proceed to describe the same.

The frame is made of strong timbers, about eight feet long, five feet wide, A A being the main side timbers, and B B B cross-tie timbers, with a supporting-timber down the middle of the frame. It hangs low upon the driving-wheels C C, which have independent axles $a\ a$, which run in cap-boxes $b\ b$ on the top of the framing-timbers A A. In front is the driver's seat D, and in the rear a shifting roller, E, which travels on the ground and supports the back end of the machine. It is attached to the end of a forked rod, $c$, which traverses in a semicircle on a pivot, $d$, at the other end. F is the draft-pole.

The working parts are two circular steel cutters, $e\ e$, near the bottom, in the forward part, the edges of which meet, and which revolve on upright spindles $f f$, Fig. 3, which are turned by small bevel-pinions $g\ g$, which mesh into small wheels $h\ h$, one on each of the axles of the driving-wheels C C, from which they derive motion. Directly behind the circular cutters $e\ e$ is a flat steel cutter, $i$, Fig. 1, against which they act like shears to cut the cane and corn stalks.

Each of the upright spindles $f f$ have reels $j\ j$ on them above and below, which are adjustable to the height of the corn, and have curved arms, which diverge as radii and overlap each other from opposite sides. Between the spindles and near to each on the inside are box sides G G, which flare outward in front, and are designed to guide the corn stalks in toward the cutters before they are cut, and away from them afterward onto a large horizontal circular platform, H, in the rear of the machine, as subsequently explained. Upon the forward part of the box sides G G, near the bottom, are two reels, $k\ k$, with short stout arms, moving on horizontal shafts $l\ l$, Fig. 1, which receive their motion from pulleys $m\ m$ on the same shafts, and are turned by cross-bands $s\ s$, running from pulleys $n\ n$ on the driving-wheel axles $a\ a$.

Around the platform H is a circular framing of three or more hoops, $o\ o\ o$, one above the other to the height required, for holding the corn-stalks up. One half-side of these hoops is made to open outward together at the side of the machine on hinges $v\ v$, like a gate. On the same side is a standard, I, stepped at the foot into the main timber A, on the top of which is hung a long sweep or lever, $p$, at one end of which is suspended a metal clamp or tongs, $q$, circular in form, and as large in the clasp as the circular platform H, and hanging over it.

When the machine is taken to the field to operate, it moves down the row of corn or cane so that the stalks come abreast of the reels $k\ k$, which gather up the broken or leaning stalks and pass them on with the standing stalks between the box sides G G till they are clasped by the arms of the reels $j\ j$, and are forced up between the circular cutters $e\ e$ and against the flat cutter $i$. When cut they are pushed from the reels outward behind in an upright position against a circular half-hoop, $r$, which is hung at one end on a spiral spring, $t$, Fig. 3, which bears it up toward the corn stalks as they come onto the platform, and holds them in an upright position till the platform is full and the shock is formed. The pressure of the upright stalks from the reels upon the platform H revolves it until it is full, or the platform may be moved by suitable gearing. The half-hook $r$ holds the stalks upright while the shock is forming on the platform, receiving the first stalks as they are discharged from the box sides G G. When the platform is filled with standing stalks the clamp $q$ is swung around by the lever $p$ and clasps the upper part, drawing the tops together, which are then tied into a shock. The half-side gate of the hoops $o\ o\ o$ is then swung open, and the shock slipped off the platform by means of the lever $p$ and the clamp $q$, which lift it up and set it down on the ground standing. This operation is repeated as the machine travels down the row of corn or cane, and the work is rapidly performed, setting the shocks down successively in rows.

Having thus described my invention, I claim as new and desire to secure by Letters Patent—

1. The reels $j\ j$, with their arms engaging with each other, in combination with the box G, substantially as described, for the purpose specified.

2. The reels $k\ k$, in front of the sides G G, for gathering up the leaning and broken stalks and passing them onto the cutters, constructed substantially as herein described.

3. The arrangement of the revolving platform H, hoop $o$, discharging-gate, half-hoop $r$, and spiral spring $t$, constructed and operating substantially as and for the purpose specified.

4. The lever $p$ and the clamp $q$, suspended by the standard I over the platform H, to gather the shock together at the top and set it off standing upright on the ground, constructed substantially as herein described.

SAMUEL SECRIST.

Witnesses:
EDWARD THRASHE,
ROBERT N. JORDAN.